US011249760B2

(12) United States Patent
Lu et al.

(10) Patent No.: US 11,249,760 B2
(45) Date of Patent: Feb. 15, 2022

(54) PARAMETER MANAGEMENT BETWEEN PROGRAMS

(71) Applicant: INTERNATIONAL BUSINESS MACHINES CORPORATION, Armonk, NY (US)

(72) Inventors: Jing Lu, Beijing (CN); Bao Zhang, Beijing (CN); Naijie Li, Beijing (CN); Jin Hong Fu, Beijing (CN); Kershaw Mehta, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 3 days.

(21) Appl. No.: 16/380,232

(22) Filed: Apr. 10, 2019

(65) Prior Publication Data
US 2020/0326942 A1 Oct. 15, 2020

(51) Int. Cl.
G06F 13/10 (2006.01)
G06F 9/30 (2018.01)
G06F 9/54 (2006.01)
G06F 9/34 (2018.01)

(52) U.S. Cl.
CPC ............. G06F 9/3017 (2013.01); G06F 9/34 (2013.01); G06F 9/54 (2013.01)

(58) Field of Classification Search
CPC ............. G06F 9/3017; G06F 9/34; G06F 9/54
See application file for complete search history.

(56) References Cited

U.S. PATENT DOCUMENTS 4,970,639 A * 11/1990 Diefendorf ............... G06F 8/52
717/174
5,452,456 A 9/1995 Mourey et al.
5,490,256 A 2/1996 Mooney et al.
(Continued)

FOREIGN PATENT DOCUMENTS

JP 2008305279 A * 12/2008

OTHER PUBLICATIONS

Translation_of_JP2008305279A "Data transmission system" (Year: 2008).*
(Continued)

Primary Examiner — Charles E Anya
Assistant Examiner — Abdou K Seye
(74) Attorney, Agent, or Firm — Cantor Colburn LLP; Teddi Maranzano

(57) ABSTRACT

Methods, systems, and computer program products for parameter management between programs with different addressing modes are described. A request may be received from a first program with a first addressing mode in a first runtime environment for calling a second program with a second addressing mode different from the first addressing mode, where at least one parameter included in the request is for calling the second program. A parameter area may be allocated in the first runtime environment for the at least one parameter. The at least one parameter may be stored in the allocated parameter area. The second program may be invoked based at least in part on the at least one parameter in the allocated parameter area. In this manner, parameter(s) may be communicated between the first program and the second program in an easy and effective way.

9 Claims, 5 Drawing Sheets

(56) References Cited

U.S. PATENT DOCUMENTS

| | | | |
|---|---|---|---|
| 5,581,769 A * | 12/1996 | Wallace | G06F 9/4486 719/315 |
| 5,724,585 A | 3/1998 | Hassitt et al. | |
| 5,764,947 A | 6/1998 | Murphy et al. | |
| 5,784,638 A | 7/1998 | Goetz et al. | |
| 5,987,495 A | 11/1999 | Ault et al. | |
| 6,021,265 A | 2/2000 | Nevill | |
| 6,199,202 B1 | 3/2001 | Coutant et al. | |
| 6,502,237 B1 | 12/2002 | Yates et al. | |
| 6,725,366 B1 | 4/2004 | Swanberg | |
| 7,171,543 B1 | 1/2007 | Ronen et al. | |
| 7,406,681 B1 | 7/2008 | Hinker | |
| 7,451,298 B2 | 11/2008 | Peak et al. | |
| 8,813,104 B2 | 8/2014 | Saborowski | |
| 9,569,234 B2 | 2/2017 | De et al. | |
| 9,652,210 B2 | 5/2017 | Suchy et al. | |
| 2004/0268319 A1 | 12/2004 | Tousignant | |
| 2005/0086650 A1 | 4/2005 | Yates et al. | |
| 2006/0184919 A1 | 8/2006 | Chen et al. | |
| 2006/0184920 A1 | 8/2006 | Want et al. | |
| 2008/0034194 A1 | 2/2008 | Peak et al. | |
| 2009/0089764 A1 | 4/2009 | Lai et al. | |
| 2011/0219213 A1 * | 9/2011 | Busaba | G06F 9/30181 712/208 |
| 2012/0233612 A1 | 9/2012 | Beckett | |
| 2012/0304160 A1 | 11/2012 | Soeder | |
| 2014/0365754 A1 | 12/2014 | Combs et al. | |
| 2015/0277867 A1 | 10/2015 | Hasabnis et al. | |
| 2016/0011869 A1 | 1/2016 | Jackson | |
| 2017/0039367 A1 | 2/2017 | Ionescu et al. | |
| 2017/0329621 A1 | 11/2017 | Beckett | |
| 2020/0192730 A1 * | 6/2020 | Li | G06F 9/547 |

OTHER PUBLICATIONS

Microsoft; "32-bit and 64-bit Interoperability;" https://msdn.microsoft.com/en-us/library/windows/desktop/ee872017(v=vs.85).aspx; retrieved Jun. 23, 2018; pp. 1-2.

List of IBM Patents or Patent Applications Treated as Related; (Appendix P), Filed Apr. 12, 2019; 2 pages.

Naijie Li et al., "Interoperability Between Programs Associated With Different Addressing Modes," U.S. Appl. No. 16/217,971, filed Dec. 12, 2018.

Tang et al., "Termination of Programs Associated With Different Addressing Modes", U.S. Appl. No. 16/885,716; filed May 28, 2020.

List of IBM Patents or Patent Applications Treated as Related; (Appendix P), Filed Jul. 7, 2020; 2 pages.

IBM "select/selectex (BPX1SEL, BPX4SEL)—Select on file descriptors and message queues"https://www.ibm.com/support/knowledgecenter/en/SSLTBW_2.3.0/com.ibm.zos.v2r3.bpxb100/sel.htm (Retrieved Aug. 20, 2020), 12 pages.

List of IBM Patents or Patent Applications Treated as Related; (Appendix P), Filed Jun. 25, 2021; 2 pages.

Microsoft, "Process Interoperability;" https://docs.microsoft.com/en-us/windows/win32/winprog64/process-interoperability (retrieved Oct. 21, 2019), 1 page.

* cited by examiner

PARAMETER MANAGEMENT BETWEEN PROGRAMS

BACKGROUND

The present invention generally relates to program management. Specifically, the present invention relates to computer-implemented methods, computer-implemented systems, and computer program products for managing parameters between two programs with different addressing modes (AMODEs).

With new developments in computer science, new computer architectures have been developed, which in turn, can result in changes to the addressing modes for programs. For example, some early development programs use 32-bit address space addressing, while some recently developed programs use 64-bit address space addressing. Some compilers can provide options for users to select an addressing mode from several available addressing modes in order to compile a program. Some current operating systems can support different programs with different addressing modes.

SUMMARY

In one aspect, a computer-implemented method is disclosed. According to the method, a request may be received by one or more processors from a first program with a first addressing mode in a first runtime environment for calling a second program with a second addressing mode different from the first addressing mode, here at least one parameter included in the request is for calling the second program. A parameter area may be allocated by one or more processors in the first runtime environment for the at least one parameter. The at least one parameter may be stored by one or more processors in the allocated parameter area. The second program may be invoked by one or more processors based on the at least one parameter in the allocated parameter area.

In another aspect, a computer-implemented system is disclosed. The computing system comprises a computer processor coupled to a computer-readable memory unit, where the memory unit comprises instructions that when executed by the computer processor implements the above method.

In another aspect, a computer program product is disclosed. The computer program product comprises a computer readable storage medium having program instructions embodied therewith. The program instructions are executable by an electronic device to cause the electronic device to perform actions of the above method.

It is to be understood that the summary is not intended to identify key or essential features of embodiments of the present invention, nor is it intended to be used to limit the scope of the present embodiment. Other features of the present embodiment will become easily comprehensible through the description below.

BRIEF DESCRIPTION OF THE DRAWINGS

Through the more detailed description of some embodiments of the present embodiment in the accompanying drawings, the above and other objects, features and advantages of the present embodiment will become more apparent, wherein the same reference generally refers to the same components in the embodiments of the present embodiment.

Throughout the drawings, same or similar reference numerals represent the same or similar elements.

DETAILED DESCRIPTION

Figure 1:
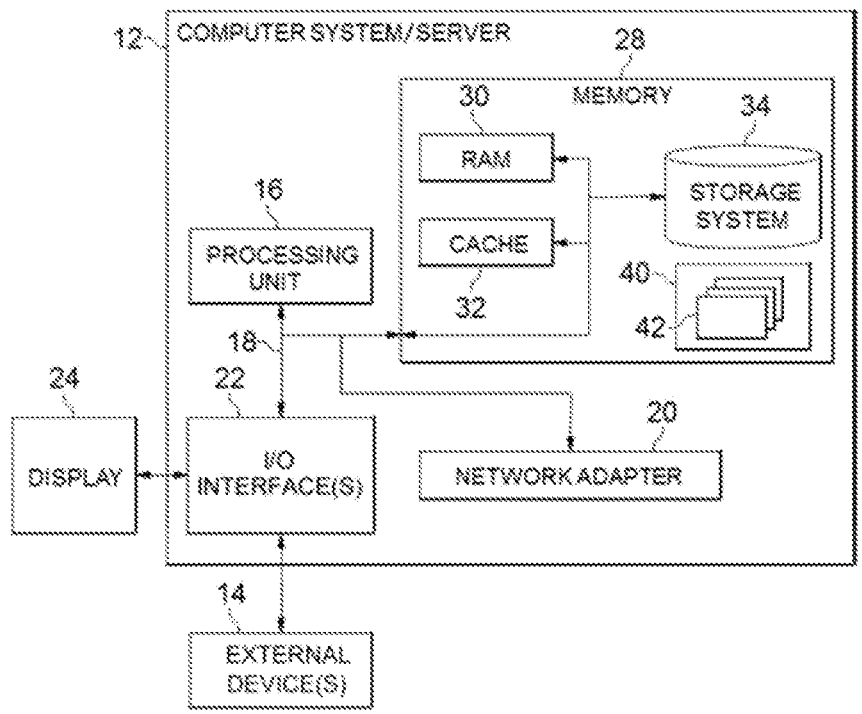
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
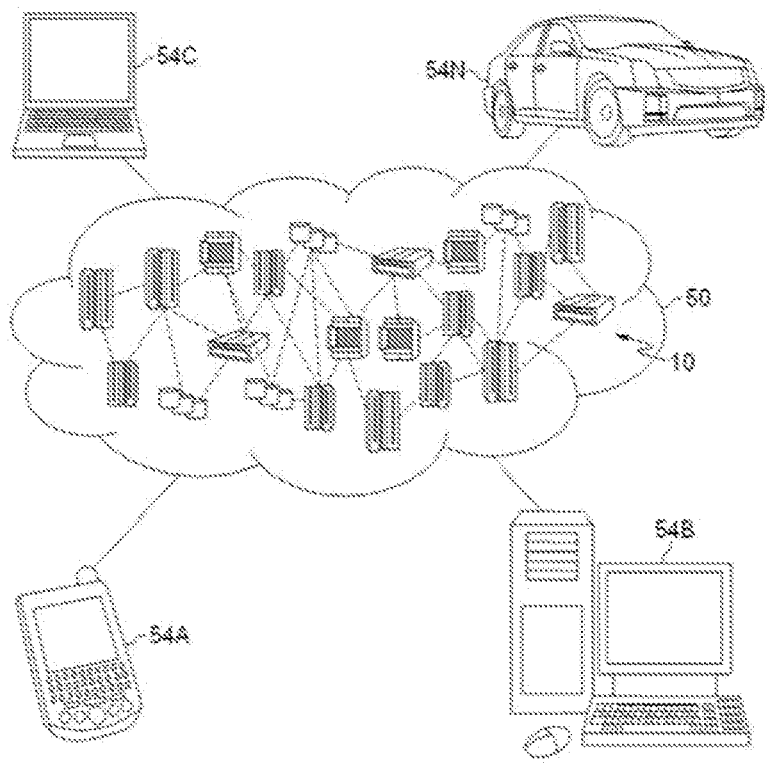
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
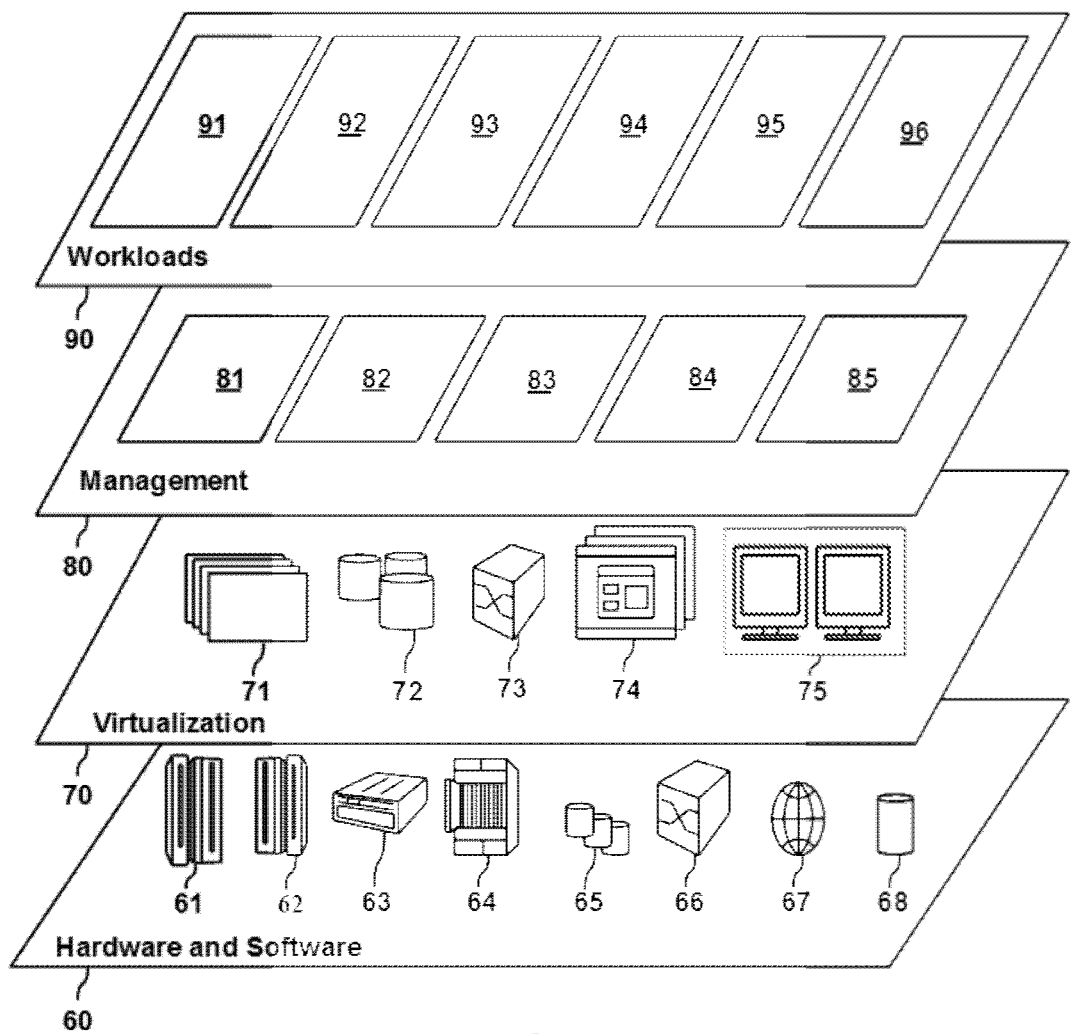
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parameter management 96.

It should be noted that the processing of parameter management according to embodiments of this invention could be implemented by the computer system/server 12 of FIG. 1. Hereinafter, reference will be made to FIG. 4 to FIG. 9 to describe details of the parameter management 96.

Currently, programs with different addressing modes coexist, therefore how to exchange parameters between two of these programs becomes a focus. For the sake of description, embodiments of the present invention will be described by taking a first program with an M bits addressing mode (abbreviated as AMODE M) and a second program with an N bits addressing mode (abbreviated as AMODE N). Embodiments of the present invention do not limit exact values of M and N. In some embodiments, M may be greater than N, while in some embodiments M may be smaller than N. Here, M and N may represent a value of powers of 2 such as 32, 64 or other values.

There are various existing solutions for supporting interactions between two programs with different addressing modes, each of which suffers from various technical drawbacks. For example, inter-process communication has been used but the overhead that it introduces results in poor performance. Moreover, redesign of the original programs is required, and the redesign includes additional development and testing which requires significant effort and can result in significant delay. In addition, each programming language has its own inter-process communication semantics, and calls between two programs with different addressing modes may result in issues.

Another existing approach for supporting interactions between two programs is a remote call based on, for example, a RESTful Application Programming Interface (API). However, the performance associated with remote calls is even worse than with inter-process communication. Yet another existing approach is to recompile the program. For example, a 32-bit application can be recompiled as a 64-bit application. This approach, however, requires recompilation of the program, which means a disaster, especially for large enterprises.

Figure 4:
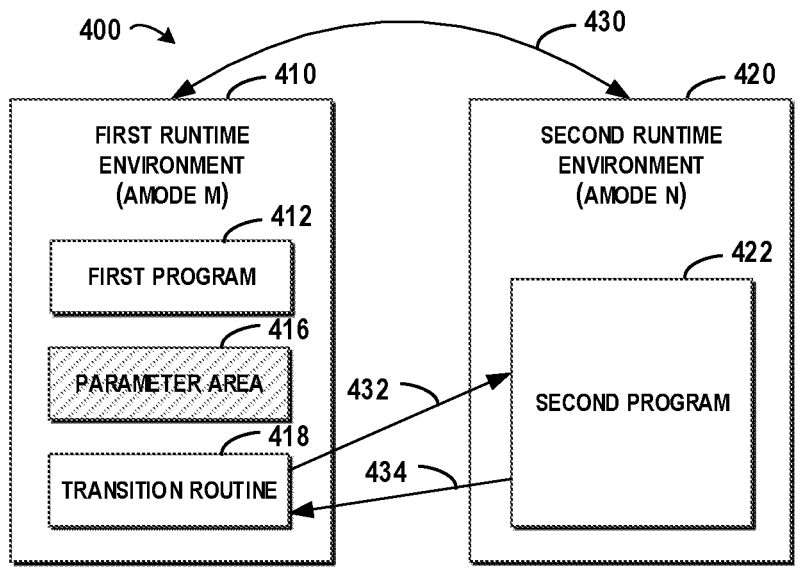
FIG. 4 depicts an example diagram for parameter management between a first program and a second program with different addressing modes according to an embodiment of the present invention.

In view of the above, the present invention provides an effective solution for managing parameters between programs with different addressing modes. Hereinafter, reference will be made to FIG. 4 for a general description of embodiments of the present invention. FIG. 4 depicts an example diagram 400 for parameter management between a first program 412 and a second program 422 with a first addressing mode and a second addressing mode respectively according to an embodiment of the present invention.

In FIG. 4, the first program 412 with the addressing mode of M (AMODE M) may run in a first runtime environment 410, and the second program 422 with the addressing mode of N (AMODE N) may run in a second runtime environment 420. And the first environment 410 and the second environment 420 run in the same computer under the same operation system. Here, the values of M and N may be integers of powers of 2, where M may be greater than N or M may be less than N. For example, M may equal to 32 and N may equal to 64. For another example, M may equal to 64 and N may equal to 32. As shown in FIG. 4, the second runtime environment 420 may be a pre-initialized runtime environment. In some embodiments, the second runtime environment 420 may be terminated when the first runtime environment 410 terminates. In some embodiments, the second runtime environment 420 may be a basic runtime environment 420 for running the second program 422 with AMODE N.

Before the first program 412 calls the second program 422, a transition routine 418 may make the second runtime environment 420 anchored to the first runtime environment 410 as shown by an arrow 430. Here, the transition routine 418 is for implementing the method of the present invention. Once the transition routine 418 receives a request from a first program 412 for calling the second program 422, and at least one parameter included in the request are needed to be transmitted to the second program 422 for calling the second program 422, then in the first runtime environment 410, a parameter area 416 may be allocated by the transition routine 418 for the at least one parameter from the first program 412 to the second program 422. Here, the parameter area 416 may be a storage space in memory for storing at least one parameter that is used by the second program 422 and the size of the parameter area 416 may vary based on the first program 412 and the second program 422.

Then, the at least one parameter included in the request may be stored into the allocated parameter area 416 by the transition routine 418 as the at least one parameter with AMODE N for calling the second program 422 by the first program 412. In order to invoke the second program 422 in the first runtime environment 410, the at least one parameter in the parameter area 416 may be transmitted to the second program 422 by the transition routine 418 shown by an arrow 432. And the result of revoking the second program 422 may be returned to the first program 412 shown by an arrow 434 which will be described in detail later.

With these embodiments, the parameter area 416 may facilitate parameters transmission from the first program 412 with the AMODE M to the second program 422 with the AMODE N different from the AMODE M in a more effective and convenient manner without requirements for modifying the first and the second programs 412 and 422.

Figure 5:
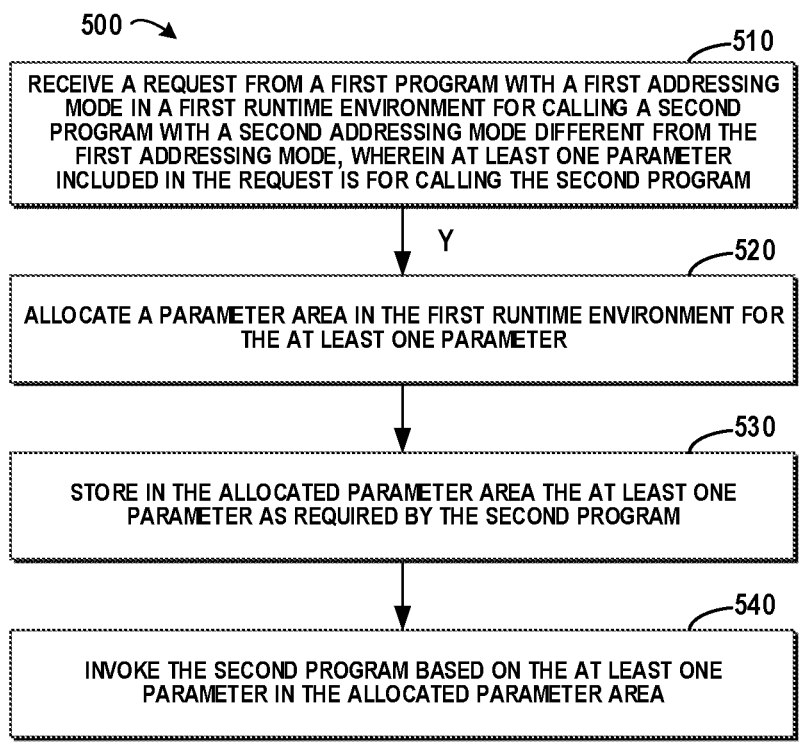
FIG. 5 depicts an example flowchart of a method for parameter management between a first program and a second program with different addressing modes according to an embodiment of the present invention.

Reference will be made to FIG. 5 for more details about embodiments of the present invention. FIG. 5 depicts an example flowchart of a method 500 for parameter management between the first program 412 and the second program 422 with different addressing modes according to an embodiment of the present invention. According to embodiments of the present invention, the first program 412 may call the second program 422 in the first runtime environment 410. Here, the first program 412 and the second program 422 may be two individual programs with different addressing modes. For example, the first program 412 may use the AMODE M, and the second program 422 may use the AMODE N.

Figure 6:
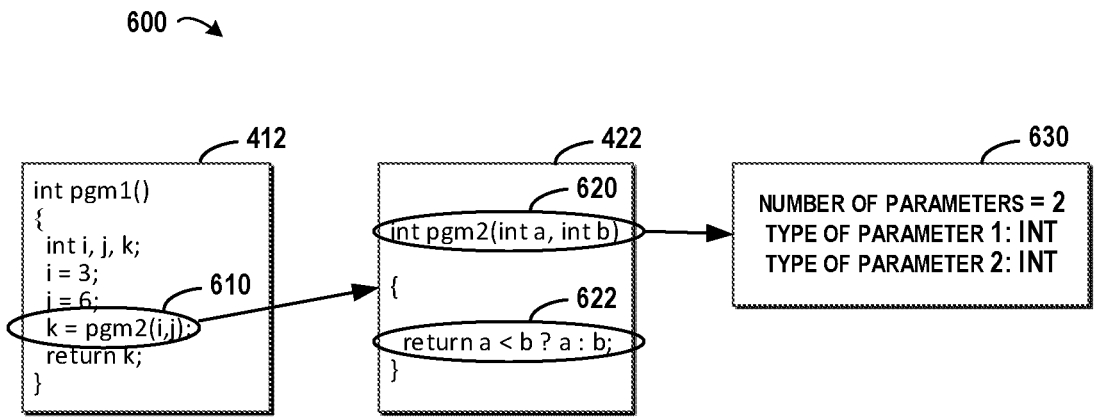
FIG. 6 depicts example source codes for the first program and the second program respectively and an example parameter descriptor obtained from the second program according to an embodiment of the present invention.

At block 510, a request is received from the first program 412 for calling the second program 422 in the first runtime environment 410. Reference will be made to FIG. 6 for descriptions of the request. FIG. 6 shows example source codes for the first program 412 and the second program 422 respectively and an example parameter descriptor 630 obtained from the second program 422. As shown in FIG. 6, the first program 412 named by "pgm1" and the second program 422 named by "pgm2" are written in C language. The first program 412 and the second program 422 may use different addressing modes. For example, the first program 412 may use a 64-bits addressing mode and the second program 422 may use a 32-bits addressing mode. As shown FIG. 6, code 610 in the first program 412 calls the second program 422 by "k=pmg2(i, j)" during running. At this point, the transition routine 418 may receive a request from the first program 412 for calling the second program 422, and the request includes at least one parameter from the first program 412 for running the second program 422.

Although FIG. 6 shows examples where both of the first program 412 and the second program 422 are written in the same programming language, the two programs 412 and 422 may be written in different languages. For example, the first program 412 may be written in C language, and the second program 422 may be written in Java language.

Referring back to FIG. 5, at block 520, the parameter area 416 may be allocated by the transition routine 418 for transmitting the at least one parameter from the first program 412 to the second program 422. In these embodiments, the size of the parameter area 416 may depend on the storage space for facilitating parameter transmission from the first program 412 to the second program 422. A function such as getIPA( ) may be provided to allocate the parameter area 416.

In some embodiments, the size may be a predetermined value. Alternatively and/or in addition to, the size may be determined based on how many parameters should be transmitted from the first program 412 to the second program 422. Usually, the first program 412 calls the second program 422 by one or more parameters. Referring to the example in FIG. 6, the first program 412 calls the second program 422 by two parameters i and j with the integer type. Accordingly, the size of the parameter area 416 may be determined based on the two parameters.

According to embodiments of the present invention, the parameter area 416 may be allocated with an estimated size that is sufficient for holding parameter(s) for an ordinary second program. With the estimated size, when the first program 412 calls second programs 422 multiple times, the parameter area 416 that is allocated for the second programs 422 for the first time may be reused by the subsequent second program(s) 422. Accordingly, the step for allocating may be omitted when invoking the subsequent second program(s), such that the performance of the first program 412 may be increased.

Referring back to FIG. 5, at block 530, the at least one parameter included in the request may be stored in the allocated parameter area 416 as required by the second program for calling the second program 422. Here, the at least one parameter may be used for communicating from the first program 412 to the second program 422. Besides the different memory addressability capabilities (e.g., 4 gigabyte for a 32-bit addressing mode and 16 exabytes for a 64-bit addressing mode) caused by different addressing modes, a linkage convention also varies based on the addressing mode. Here, the linkage convention may define how stack frames are managed and how parameters are passed. With respect to the linkage convention differences, in a 64-bit program, for example, storage areas and registers are twice as large as in a 32-bit program such that calling conventions for a 64-bit program take advantage of the additional register space to pass more parameters in registers. Further, some 32-bit linkage conventions may require upward stack while some 64-bit linkage conventions may require downward stack.

Accordingly, in embodiments of the present invention, the at least one parameter may be stored based on a second linkage convention of the second program 422. For example, if the second linkage convention defines that the second program 422 may directly obtain values of the at least one parameter, then a value list comprising values of the at least one parameter may be directly stored in the allocated parameter area 416. In another example, if the second linkage convention defines that the second program 422 may obtain values of the at least one parameter based on an address list, then an address list comprising addresses of the at least one parameter may be stored in the allocated parameter area 416.

According to embodiments of the present invention, a parameter descriptor may be determined based on a definition of the second program 422, so as to decide how many parameters should be stored and what type of each parameter is. Referring to FIG. 6, a parameter descriptor 630 can be obtained from a definition of the second program 422 according to an embodiment of the present invention. In the second program 422, the definition 620 can include two input parameters. The first input parameter of the second program 422 is defined by "int a," which indicates that the input parameter "a" is in an integer type. The second input parameter of the second program 422 is defined by "int b," which indicates that the input parameter "b" is in an integer type.

Accordingly, the size of the at least one parameter may be obtained based on the number of input parameter(s) in the definition, and thus the size of the group of parameters may be determined as two. Further, a type of each parameter of the at least one input parameter can be determined based on the definition, for example, the types of both input parameters in FIG. 6 are integer. Then, the parameter descriptor 630 may be determined based on the obtained size and type(s). In FIG. 6, the number of the parameters is 2, and the types of both of the first and the second parameters are integer. It is to be understood that the parameter descriptor 630 is just an example for describing the format of the parameters. In other embodiments, the parameter descriptor 630 may be saved in other data structures such as a table. Although both parameters in the definition 620 are integer, in other examples, the parameters may be of different types. For example, the first parameter may be an integer type and the second parameter may be a float type.

According to embodiments of the present invention, the at least one parameter may be stored based on the determined parameter descriptor 630 according to the second linkage convention. Continuing the example in FIG. 6, the two input parameters such as parameters "a" and "b" with the integer type may be input. Here, the parameter descriptor 630 defines a format for how to pass the parameters, and then the values of a=3 and b=6 may be stored in the parameter area 416 according to the second linkage convention. In some embodiments, if the second linkage convention requires to pass the values in the parameter area 416, then a value list comprising the values of a=3 and b=6 may be directly constructed in the parameter area 416.

Figure 7:
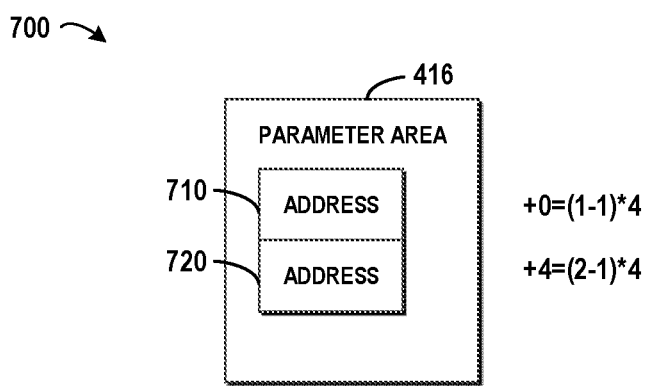
FIG. 7 depicts an example diagram for an address list prepared in the parameter area according to an embodiment of the present invention.

According to embodiments of the present invention, if the second linkage convention requires to pass the values via an address list, then the address list should be constructed in the parameter area 416. Specifically, in order to store address(es) of the at least one parameter based on the determined parameter descriptor 630, an address list comprising address(es) for the at least one parameter may be generated. Here, one entry in the address list may be an address for one parameter of the at least one parameter. Reference will be made to FIG. 7 for more details about the address list.

FIG. 7 depicts an example diagram 700 for an address list prepared in the parameter area 416 according to an embodiment of the present invention. In FIG. 7, the address list may comprise two addresses: an address 710 indicating an address for storing a value of the first parameter "a;" and an address 720 indicating an address for storing a value of the second parameter "b." It is assumed that the type "integer" is stored in a unit of 4 bytes and the addresses of the two parameters are in a continuous manner with a starting address of "+0," the address 710 may point to: $+0=(1-1)*4$, and the address 720 may point to: $+4=(2-1)*4$.

It is to be understood that FIG. 7 only illustrates an example embodiment for the address list. In some embodiments, the type "integer" may be stored in a unit with more or less bytes. Suppose that the integer type is stored in a unit of 8 bytes and the addresses of the two parameters are in a continuous manner with a starting address of "+0," the address 710 may point to: $+0=(1-1)*8$, and the address 720 may point to: $+8=(2-1)*8$. In some embodiments, the second program 422 may comprise more or less parameters. For example, if the second program 422 has K integer parameters and the unit comprises L bytes, then the address for the Kth parameter may point to $(K-1)*L$.

Referring back to FIG. 5, at block 540, the transition routine 418 may send the request to the second program 422 based on the at least one parameter in the allocated parameter area 416. With these embodiments, the parameter area 416 may be used as a shared storage area between the first program 412 and the second program 422. The values for invoking the second program 422 may be indicated in the parameter area 416, and then the first program 412 may communicate with the second program 422.

Still referring to FIG. 6, the second program 422 is called in the code 610 of the first program 412. Here, a function such as runOnN( ) in the transition routine 418 may be called to invoke the second program 422 in the AMODE N. At this point, the value of the first parameter is set to 3 by code "i=3," and the value of the second parameter is set to 6 by code "j=6." In embodiments where the second linkage convention requires to pass values by the address list as described in the preceding paragraphs, the address 710 points to the address of "+0" (where the value 3 is stored at this address), and the address 720 points to the address of "+4" (where the value 6 is stored at this address). In some embodiments, another function runOnM( ) in the transition routine 418 may be defined for invoking a program in the AMODE M.

According to embodiments of the present invention, in order to invoke the second program 422 in the first runtime environment 410, at least one register may be set up in the second runtime environment 420 based on the parameter descriptor that is created for the second program 422. Next, the second program 422 may be executed in the second runtime environment 420. The at least one parameter is obtained by the second program 422 based on the second linkage convention and the at least one set-up register. For example, if the linkage convention defines that the address list should be passed via a specific register X, then the starting address of the address list as shown in FIG. 7 should be placed into the specific register X. The process is referred as register set-up process. After the register(s) is set up appropriately according to the second linkage convention, the second program 422 may access the parameters transparently during execution. For example, the input parameters (a=3, b=6) may be retrieved from the addresses list specified in register X, regardless of the AMODE of the first program 412. For a single call scenario, the transition routine 418 may set up all registers appropriately. While for nested call scenario, the transition routine 418 can also set up all registers.

After the second program 422 is executed, if the second program 422 returns a result, the result may be transmitted according to a first linkage convention of the first program 412 from the second program 422 for being retrieved by the first program 412. Still referring to FIG. 6, code 622 in the second program 422 may be executed based on values (a=3 and b=6) indicated in the address list, and then a result may be returned based on the smaller one of the parameters a and b. In this example, as a=3<b=6, the value of a (a=3) may be transmitted to the first program 412. For example, returned value(s) from the second program 422 may be transmitted to a register defined by the second program 422, and the transition routine 418 may get the returned value(s) based on the second linkage convention of the second program, and then store the gotten returned value(s) into a register defined by the first program 412, then the first program 412 can get the returned value(s) based on the first linkage convention of the first program.

According to embodiments of the present invention, the first program 412 may be a single thread program. At this point, the second program 422 may be called by the first program 412. With these embodiments, the parameter area 416 allocated in the first runtime environment 410 may be used as a storage area shared by the first program 412 and the second program 422 for communicating input parameter(s).

Although the preceding paragraphs describe embodiments where the first program 412 calls one second program 422 once, the first program 412 may call the second program 422 multiple times in other embodiments. For example, in the example of FIG. 6, the first program 412 may call program pgm22( ) with AMODE N after the code 610 for the second time. In calling the program pgm22( ) for the second time, if the parameter area 416 is sufficient for holding the parameter(s) for the program pgm22( ) for the second time, then the parameter area 416 may be reused and the allocating step may be omitted to increase the performance of the program pgm1( ).

According to embodiments of the present invention, the second program 422 comprises a nested call for calling a third program being associated with a first addressing mode. In these embodiments, the first program 412 with AMODE M may call the second program 422 with AMODE N, and then the second program 422 with AMODE N may call the third program with AMODE M again. In these embodiments, the transition routine 418 running in the first runtime environment 410 can manage the nested call.

Figure 8:
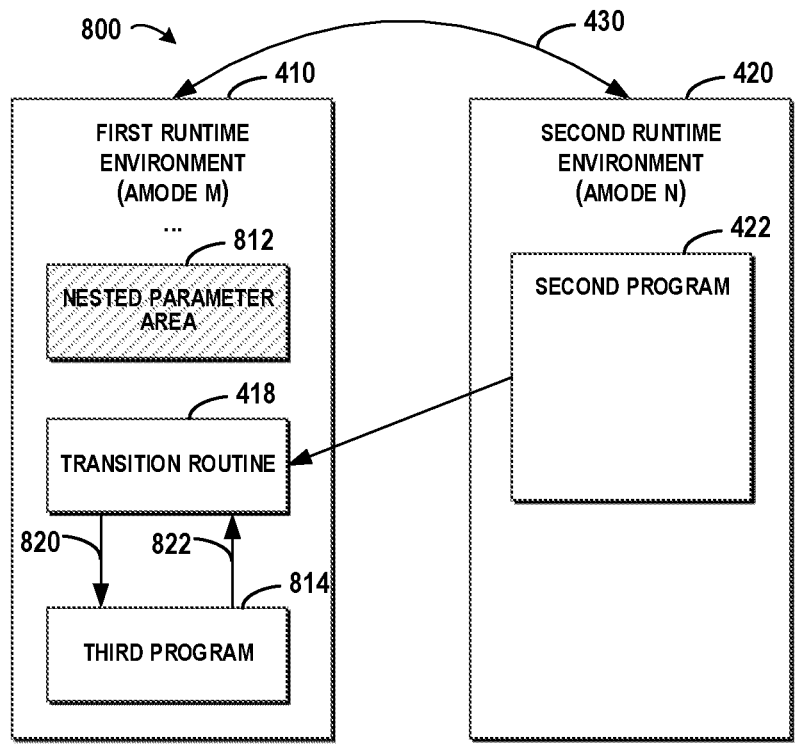
FIG. 8 depicts an example diagram for parameter management between a first program and a second program according to an embodiment of the present invention, here the second program further calls a third program with the first addressing mode.

Reference will be made to FIG. 8 for illustration, which figure depicts an example diagram 800 for parameter management between the first program 412 and a second program 422 according to an embodiment of the present invention. As shown in FIG. 8, the second program 422 comprises a nested call for calling a third program 814 running in the first environment 410.

According to embodiments of the present invention, in order to invoke the third program 814, the transition routine 418 is also configured to handle such parameter passing, stack manipulation, and the like for the first runtime environment 410. Specifically, the transition routine 418 may save the context of the second program 422 before calling the third program 814, and then calls the third program 814. The transition routine 418 may set up the appropriate register(s) according to the third linkage convention of the third program 814.

Further, a nested parameter area 812 may be allocated in a stack frame by the transition routine 418 in the first runtime environment 410 for transmitting parameters(s) from the second program 422 to the third program 814. In the nested parameter area 812, a further at least one parameter may be allocated for calling the third program 814 by the second program 422. Here, the method for allocating the nested parameter area 814 and storing the further at least one parameter may be different from those for allocating the parameter area 416 and storing the at least one parameter in the single thread mode. Specifically, the differences lie in: (1) the nested parameter area 812 is allocated in the stack frame in the first runtime environment 410 (not in the second environment 420), while the parameter area 416 for the single thread mode is allocated in heap storage of the first runtime environment 410. (2) the further at least one parameter in nested parameter area 812 will not be copied to the target runtime environment for the nested call because the nested parameter area 812 is allocated in the target runtime environment already, while the at least one parameter in parameter area 416 should be copied to the target runtime environment for the single thread. Here, the target runtime environment refers to a runtime environment where the called program is to be executed.

When the second program 422 calls the third program 814, the third program 814 may be invoked by the transition routine 418 in the first runtime environment 410 based on the further at least one parameter. Here, the further at least one parameter may be stored according to a third linkage convention for executing the third program 814. After execution of the third program 814, the result of the third program 814 may be returned from the third program 814 indicated by an arrow 822. Further, the transition routine 418 restores the saved context and returns control to the second program 422.

Figure 9:
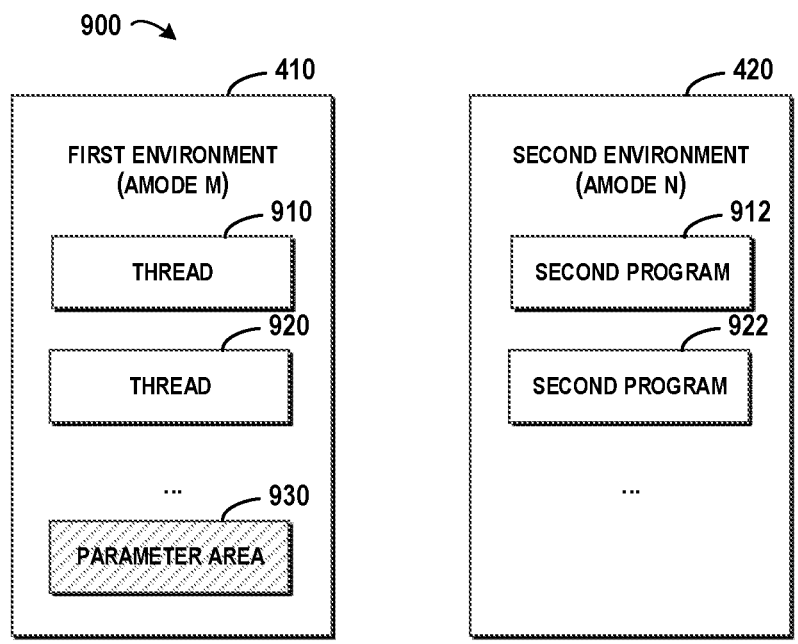
FIG. 9 depicts an example diagram for parameter management for a multi-thread program according to an embodiment of the present invention, here each of the multiple threads in the multi-thread program calls a second program.

Having described embodiments for the single thread mode and the nested mode, a multi-thread mode will be provided hereinafter. According to embodiments of the present invention, the first program 412 may be a multi-thread program. Reference will be made to FIG. 9 for more details, which depicts an example diagram for parameter management for a multi-thread program according to an embodiment of the present invention. Referring to FIG. 9, multiple threads 910, 920 and the like are initiated in the first program 412, and each of the multiple threads in the multi-thread program calls a corresponding second program. In FIG. 9, the thread 910 calls the second program 912, and the thread 920 calls the second program 922.

In some embodiments, some of the multiple threads may be run in a sequence order. In some embodiments, some of the multiple threads may be run in parallel. Here, an individual parameter area may be allocated for each of these threads based on the steps as described in the preceding paragraphs. In these embodiments, the allocated parameter areas may be released when the multiple threads terminate. With these embodiments, the multiple threads initiated in the first program 412 may transmit parameters with their corresponding second programs, and the multiple threads in the first program may call their corresponding second programs.

With the above embodiments, the parameter area 416 allocated in the first program 412 may be used as a parameter transmission area shared by the first program 412 and the second program 422. By using the parameter area 416, the first program 412 (a single-thread program, a nested program, and a multi-thread program) may transmit parameter(s) to the second program 422 in an easy and effective manner without a need to re-write the two programs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by one or more processors, a request from a first program with a first addressing mode in a first runtime environment for calling a second program with a second addressing mode different from the first addressing mode, wherein at least one parameter included in the request is for calling the second program;
allocating, by the one or more processors, a parameter area in the first runtime environment for the at least one parameter of the parameters,
obtaining, by the one or more processors, a size of the at least one parameter indicating a number of the at least one parameter from a definition of the second program;
obtaining, by the one or more processors, at least one type of the at least one parameter from a definition of the second program;
determining, by the one or more processors, a parameter descriptor based at least in part on the obtained size and the at least one type;
generating, by the one or more processors, an address list for the allocated parameter area;
storing, by the one or more processors and based on the parameter descriptor, in the address list of the allocated parameter area a respective address of a corresponding parameter of the at least one parameter, wherein storing the respective in the address list is based on a linkage convention of the second program; and
invokin by the one or more processors, the second program based at least in part on the at least one parameter in the allocated parameter area;
wherein the linkage convention associated with the second program is a second linkage convention, and wherein invoking the second program based at least in part on the at least one parameter in the allocated parameter area comprises:
setting up, by the one or more processors, at least one register based at least in part on the second linkage convention and the parameter descriptor determined for the second program; and
receiving, by the one or more processors, at least one value returned from the second program based at least in part on both a first linkage convention associated with the first program and the second linkage convention at least in part in response to the second program having been executed.

2. The method of claim 1, wherein the second program comprises a nested call for calling a third program with the first addressing mode in the first runtime environment, the method further comprising:
allocating, by the one or more processors, a nested parameter area in a stack frame in the first runtime environment, wherein the nested parameter area is used for transmitting at least one further parameter for calling the third program by the second program;
storing, by the one or more processors, in the nested parameter area the at least one further parameter; and
invoking, by the one or more processors, the third program in the first runtime environment based at least in part on the at least one further parameter in the nested parameter area.

3. The method of claim 2, wherein invoking the third program comprises:
saving, by the one or more processors, context of the second program before invoking the third program; and
restoring, by the one or more processors, the saved context after the third program is executed.

4. The method of claim 1, wherein the first program is a multi-threaded program and the second program is called by one of multiple threads initiated in the first program.

5. A system comprising a computer processor coupled to a computer-readable memory unit, the computer-readable memory unit comprising instructions that when executed by the computer processor implements a method comprising:
receiving a request from a first program with a first addressing mode in a first runtime environment for calling a second program with a second addressing mode different from the first addressing mode, wherein at least one parameter included in the request is for calling the second program;
allocating a parameter area in the first runtime environment for the at least one parameter of the parameters;
obtaining a size of the at least one parameter indicating a number of the at least one parameter from a definition of the second program;
obtaining at least one type of the at least one parameter from a definition of the second program;

determining a parameter descriptor based at least in part on the obtained size and the at least one type;

generating an address list for the allocated parameter area;

storing, based on the parameter descriptor, in the address list of the allocated parameter area a respective address of a corresponding parameter of the at least one parameter, wherein storing the respective in the address list is based on a linkage convention of the second program; and invoking the second program based at least in part on the at least one parameter in the allocated parameter area;

wherein the linkage convention associated with the second program is a second linkage convention, and wherein invoking the second program based at least in part on the at least one parameter the allocated parameter area comprises:

setting up at least one register based at least in part on the second linkage convention and the parameter descriptor determined for the second program; and receiving at least one value returned from the second program based at least in part on both a first linkage convention associated with the first program and the second linkage convention at least in part in response to the second program having been executed.

6. The system of claim 5, wherein the second program comprises a nested call for calling a third program with the first addressing mode in the first runtime environment, the method further comprising:

allocating a nested parameter area in a stack frame in the first runtime environment, wherein the nested parameter area is used for transmitting at least one further parameter for calling the third program by the second program;

storing in the nested parameter area the at least one further parameter; and invoking the third program in the first runtime environment based at least in part on the at least one further parameter in the nested parameter area.

7. The system of claim 6, wherein invoking the third program comprises:

saving context of the second program before invoking the third program; and restoring the saved context after the third program is executed.

8. The system of claim 5, wherein the first program is a multi-threaded program, and the second program is called by one of multiple threads initiated in the first program.

9. A computer program product, the computer program product comprising a computer readable storage medium having program instructions embodied therewith, the program instructions executable by an electronic device to cause the electronic device to perform a method comprising:

receiving a request from a first program with a first addressing mode in a first runtime environment for calling a second program with a second addressing mode different from the first addressing mode, wherein at least one parameter included in the request is for calling the second program;

allocating a parameter area in the first runtime environment for the at least one parameter of the parameters;

obtaining a size of the at least one parameter indicating a number of the at least one parameter from a definition of the second program;

obtaining at least one type of the at least one parameter from a definition of the second program; determining a parameter descriptor based at least in part on the obtained size and the at least one type;

generating an address list for the allocated parameter area;

storing, based on the parameter descriptor, in the address list of the allocated parameter area a respective address of a corresponding parameter of the at least one parameter, wherein storing the respective in the address list is based on a linkage convention of the second program; and invoking the second program based at least in part on the at least one parameter in the allocated parameter area;

wherein the linkage convention associated with the second program is a second linkage convention, and wherein invoking the second program based at least in part on the at least one parameter the allocated parameter area comprises:

setting up at least one register based at least in part on the second linkage convention and the parameter descriptor determined for the second program; and receiving at least one value returned from the second program based at least in part on both a first linkage convention associated with the first program and the second linkage convention at least in part in response to the second program having been executed.

* * * * *